United States Patent [19]

Lowery

[11] 4,392,769
[45] Jul. 12, 1983

[54] HEAVY DUTY MOBILE LOADING STRUCTURE AND SYSTEM

[76] Inventor: Sterling W. Lowery, 6013 Pollard Dr., Richmond, Va. 23226

[21] Appl. No.: 236,639

[22] Filed: Feb. 20, 1981

[51] Int. Cl.³ .............................................. B65G 67/04
[52] U.S. Cl. .................................... 414/397; 14/69.5; 414/373; 414/399; 414/680
[58] Field of Search ............... 414/340, 373, 397, 399, 414/400, 572, 680, 786, 787; 193/1, 3, 17; 299/13; 14/69.5, 71.1, 71.7; 404/101

[56] References Cited

U.S. PATENT DOCUMENTS 2,192,210  3/1940  Stout .................................. 414/680
2,436,440  2/1948  Losch .................................. 414/572
4,059,195  11/1977 MacDonald et al. .......... 414/680 X

FOREIGN PATENT DOCUMENTS 156925  6/1954  Australia .............................. 414/397

Primary Examiner—Robert G. Sheridan
Attorney, Agent, or Firm—Auzville Jackson, Jr.

[57] ABSTRACT

A heavy duty structure that forms a mobile loading system is shown that is comprised of a ramp means, a dump means and crawler undercarriage for use in loading trucks by making use of bulldozers. The crawler undercarriage supports the carrier or platform which provides the base for the superstructure, power units and hydraulic systems. The system's power unit supplies the source of power to move the crawlers so the structure may be moved to any locality on the jobsite. The system's power unit also supplies power to the hydraulic systems provided to raise and lower the ramp and dump means. The carrier supports a mast means which supports the ramp means and dump means. The ramp means provides a bridge or lifting means onto which a pair of bulldozers may be alternatively driven to move the overburden to the dump means. The dump means has a temporary storage capacity which is equivalent to the capacity of the truck that is to be loaded in order to fill the trucks in one pass or dumping operation when the truck is moved into position under the dump means.

16 Claims, 7 Drawing Figures

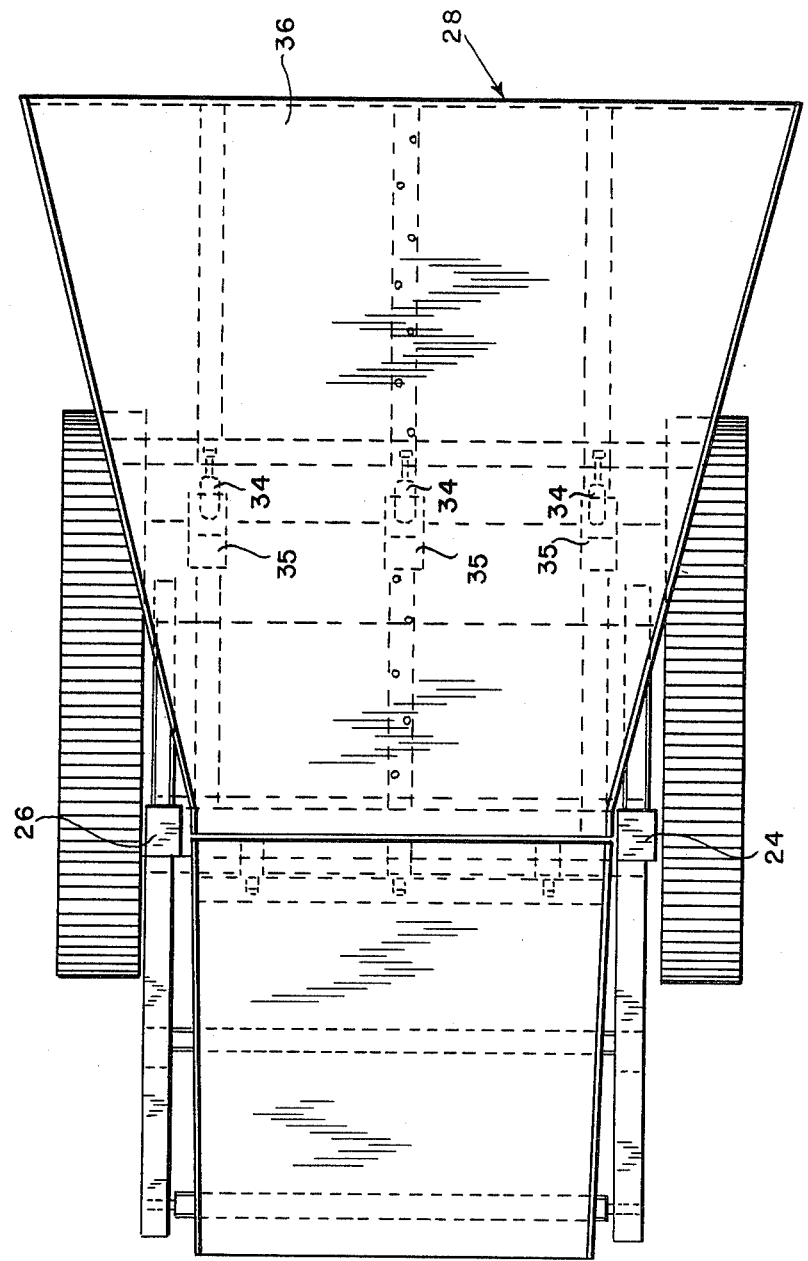

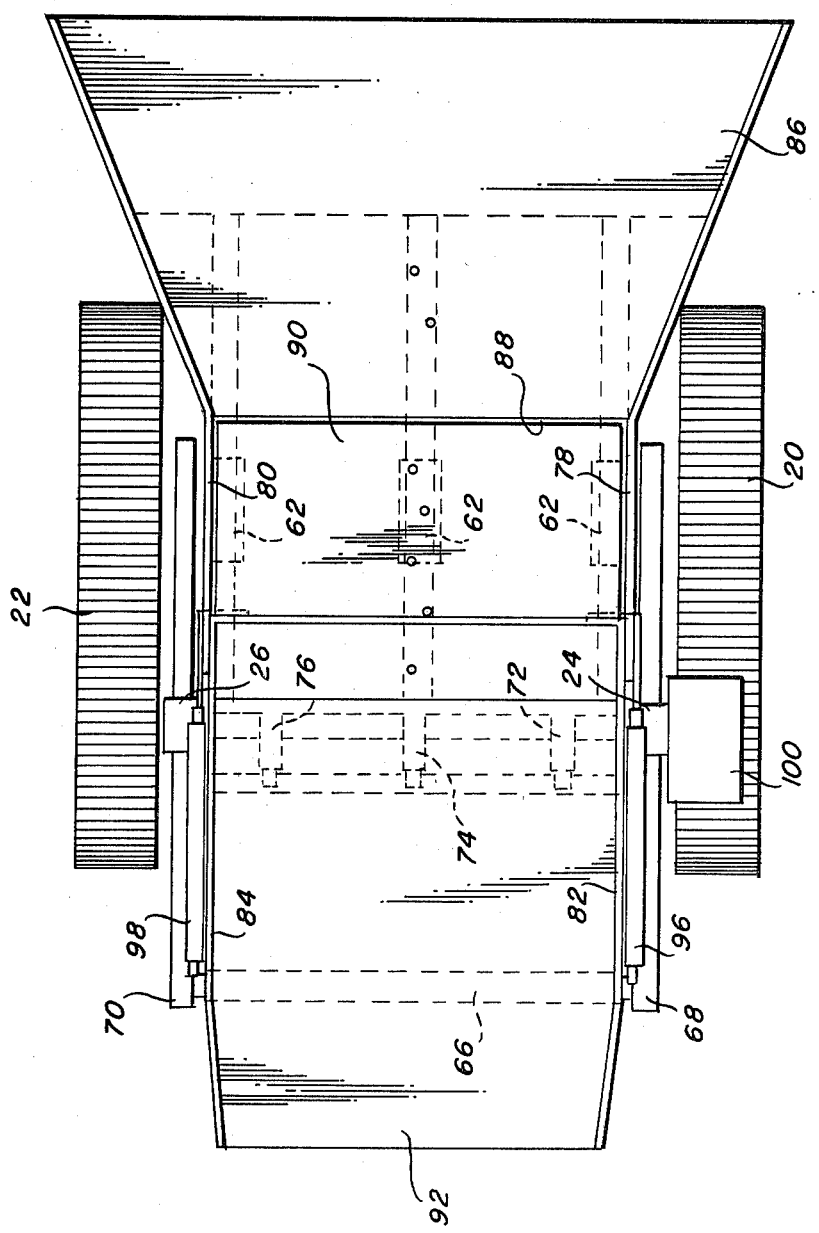

HEAVY DUTY MOBILE LOADING STRUCTURE AND SYSTEM

PRIOR ART

One extensively used system for removing the overburden from coal or ore near the surface of the earth that is adapted to be mined with strip mining procedures, is to first loosen the overburden with blasts of imbedded dynamite. The overburden is then moved to expose the material to be mined.

Most strip mines presently use one of three methods to remove overburden.
1. Dragline systems comprised of a large dragline used to move the overburden out of a pit and stack it where a bulldozer can be used to spread the overburden and reclaim in a previously stripped area to substantially reproduce the original soil condition. The mineral uncovered is then stripped out by smaller front-end loaders or shovels and removed from the pit. The dragline continuously deposits the overburden in the already stripped area beside its working station so that the bulldozers can spread it where desired.
2. Load and carry operations are comprised of large front-end loaders which carry the overburden from one pit to an already stripped out pit. They utilize their buckets as the haulage units.
3. Truck haulage systems are comprised of a loading unit and trucks to haul the overburden back to be bulldozed around to reclaim an already stripped out area.

The third system is the most commonly used. After the overburden has been blasted (dynamited), the loading unit loads this shot overburden material into large rock haulers.

The two primary loading tools used to load the rock haulers are:
1. Front-end loaders equipped with (8) (10) (12.5) and (15) yard buckets which load (35) (50) (75) (85) (100) ton trucks. The size of the trucks determines the size of the front-end loader used. Most trucks manufacturers suggest a loader that fills the trucks with the depositing of 4 to 5 buckets full in the truck.
2. Electric or hydraulic shovels equipped with (10) (15) (17) (20) yard buckets. These machines have a faster cycle time and can deliver a greater number of bucketfulls to fill the truck in the same time period.

The front-end loaders are usually combined with a bulldozer pushing overburden into it to help fill the bucket faster so as to complete the cycle faster. The conventional front-end loaders have been found to be inefficient machines for use in this environment from a standpoint of maintenance and availability. The drive system, transmission, drive axles and hydraulic systems suffer tremendous abuse constantly, as maintenance costs reflect. The machine is driven into the pits of overburden at high rpm's to move the required volumes of overburden and to keep the material moving as the operator jerks the hoist and tilt cylinders back and forth a number of times to fill the bucket. The loader is then thrown into reverse and backed up and then forward again to the side of thr truck. During this time the hoist cylinders are raised to lift the bucket above the truck in order to empty the material into the truck. The operator then jerks the tilt cylinders back and forth to empty the bucket. This constant abuse is necessary to accomplish the production necessary to justify the cost of the equipment. However, the maintenance costs and down time have increased with the size of the loaders used.

The Department of Energy is presently concerned with studies in this area having the purpose of increasing the efficiency of front-end loaders and minimizing down time required for their maintenance.

An alternative proposal is to make use of hydraulic shovels which are now being tried as an alternate loading unit. However, their costs are much greater than front-end loaders and the systems now in use are rather small and are in the 10 yard range.

Electrically driven shovels have been used for many years and appear to handle the abuse better than any of the other systems now used. Again the initial cost is approximately four or five times greater than front-end loaders so most small mines cannot afford the initial cost as well as the larger trucks that can then be utilized, usually having as much as 120 tons capacity and up.

BRIEF DESCRIPTION OF THIS INVENTION

The detailed description below covers several rudimentary forms of structures for realizing the advantages of this invention which illustrate its utility as well as a perfected, more sophisticated preferred adaptation thereof.

In its simplest form, the improved material handling apparatus of this invention for removing overburden from a strip mining site makes use of a mobile compact crawler carrier or undercarriage that is entirely self-contained, having a platform for supporting its own power source together with hydraulic or other means for operating a ramp and dump means. The platform carries a mast structure for supporting the dump means at a height somewhat higher than the side of a truck positioned at a loading station to receive the overburden to be transported to another area. The ramp and dump means deliver the material to be loaded into the truck over the platform of the crawler. The ramp is designed for receiving bulldozers which may be alternately driven onto the ramp to push overburden that is to be removed onto the ramp for delivery into the dump means to be loaded into a truck, as will become more evident from the description below.

A plurality of bulldozers may be operated in a cooperating sequence of movements to doze the overburden material over the ramp for delivery to the dump means. The ramp has an entrance of sufficient width so that two bulldozers may pass each other, one loading overburden material onto the ramp means while the other returns to the bench area being cleared. As the two or more bulldozers operate on the exposed surface of the bench of dynamite-loosened overburden, it is apparent that the material handling apparatus described herein, may be disposed at the edge of the bench to be cleared and can be used most efficiently to fill each one of a series of trucks rapidly as each truck is moved to the loading station whereby the overburden is more efficiently stripped away.

After an area of the bench to be cleared has been stripped of its layer of overburden, the crawler carried ramp and dump means are transported by means of the integral undercarriage means to another area of the bank of loosened overburdened material to be moved and the end of the ramp means may be driven into the bank at a convenient spot to cooperate with the bulldozers which are then operated over this other area to push overburden onto the ramp for delivery by the dump means into the next truck to be filled. When as much as a truck load of overburden has been pushed onto the dump means and a truck has been spotted at the loading station, the accumulated material on the dump is lowered into the truck body for removal. The truck loading procedure may be performed in this manner most expediciously since a loaded truck can be driven away and an empty truck can be spotted at the loading station while the dump means is being filled with the next load to be dropped into the next empty truck after it is moved to the loading station.

The ramp and dump means are adjustably supported in bearings at the top of the mastlike support means carried on the platform of the undercarriage and can be operated by hydraulic motor means. The undercarriage is provided with power means for driving the hydraulic pump and motor means and an operator who has full control of all of the drive means for the crawler tracks and operation of the ramp and dump means, has a protected station from where he may observe all of the operations for bulldozing overburden onto the ramp, filling the dump means and emptying the overburden from the dump means into a truck at the loading station.

In its preferred form, the system basically is comprised of two dump loaders arranged in a series relationship, a set of crawlers or wheels to make the system mobile, using a mechanical, electrical or hydraulic system for the power means.

The first of these loaders resembles a ramp as it stretches from a higher pivot point on the mast structure downwardly to a plane at the ground or a lower level. The width and size of this ramp will vary according to the size of the bulldozers that are to be used to move the overburden material. To attain fast cycle times, the opening to the ramp may be flared or funneled out to accept alternately driven bulldozers, the flared end providing an inlet equivalent to the width of two bulldozer blades. The bulldozers may be used to push the material onto this ramp, which when full, may be raised to fill the upper dump loader. The upper dump body has a load capacity that is equivalent to the capacity of the truck being loaded.

When the lower dump body or ramp is raised to the top, material will slide down into the upper dump. A unique gate, which is incorporated in the ramp floor, is then pulled forward to hold the material in the upper dump body. It is held there until a truck pulls into the loading station and is ready to be loaded. The upper dump is then raised to deliver the material into the truck. The upper body is designed so the leading edge will be in the truck and lower the material in as gently as possible into the waiting truck.

It is therefore an object of this invention to provide an improved apparatus that may be used to more efficiently remove loosened material from a bench in strip mining operations for loading into trucks for transportation elsewhere.

Another object of the invention is to provide a mobile loading system for use in strip mining operations.

Another object of the invention is to provide a ramp and dump loader means for use with a plurality of bulldozers and trucks to be filled with the loader means that may be operated together in a substantially continuous operation for stripping overburden from a bench to expose a valuable mineral.

Another object of the invention is to provide a ramp and truck loading station that may be positioned in front of a bench to be cleared so that a plurality of bulldozers may be used for pushing loosened overburden material to be removed onto the ramp and dump loader means at a truck loading station.

Another object of the invention is to provide an apparatus for loading large volumes of accumulated overburden into trucks for removal.

A still further object is to provide a simple, mobile and compact structure for loading overburden into a truck, the structure being built of elements that are rugged and that may be easily maintained.

Other objects will appear from the specification below.

IN THE DRAWINGS

FIG. 4 is a top plan view of the mobile unit of FIG. 1;

FIG. 7 is a plan view of the machine shown in FIG. 6.

DETAILED DESCRIPTION

Figure 3:
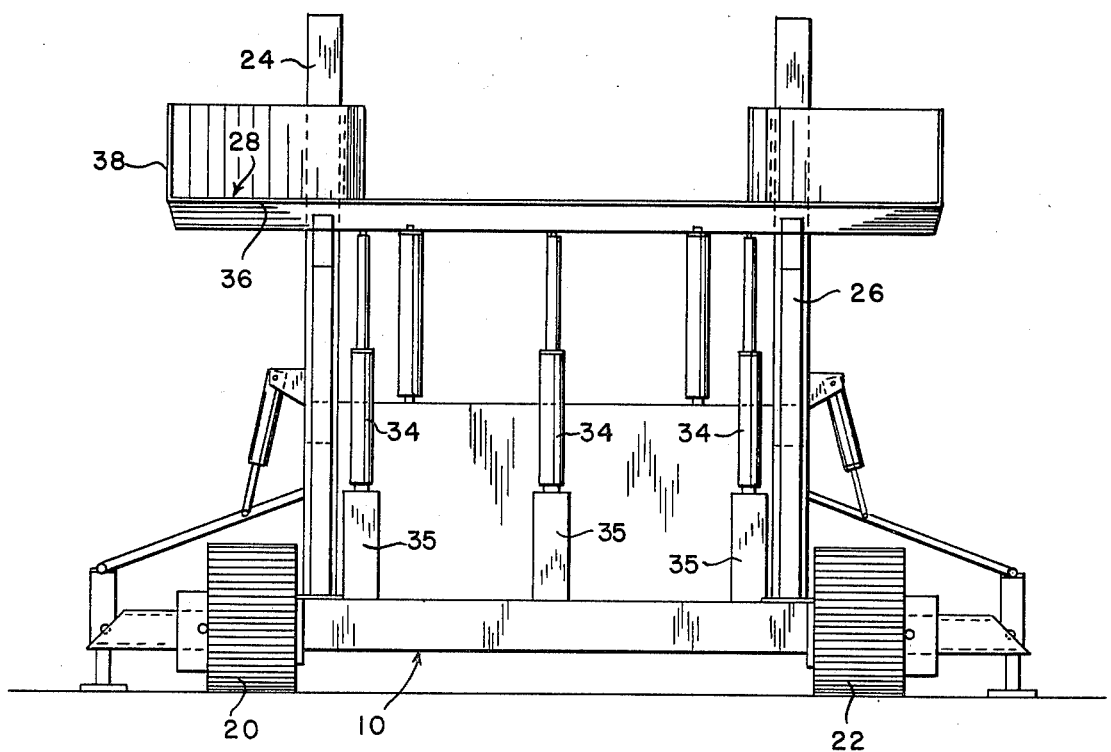
FIG. 3 is a view from the inlet end of the ramp means for the apparatus shown in FIG. 1.
Figure 5:
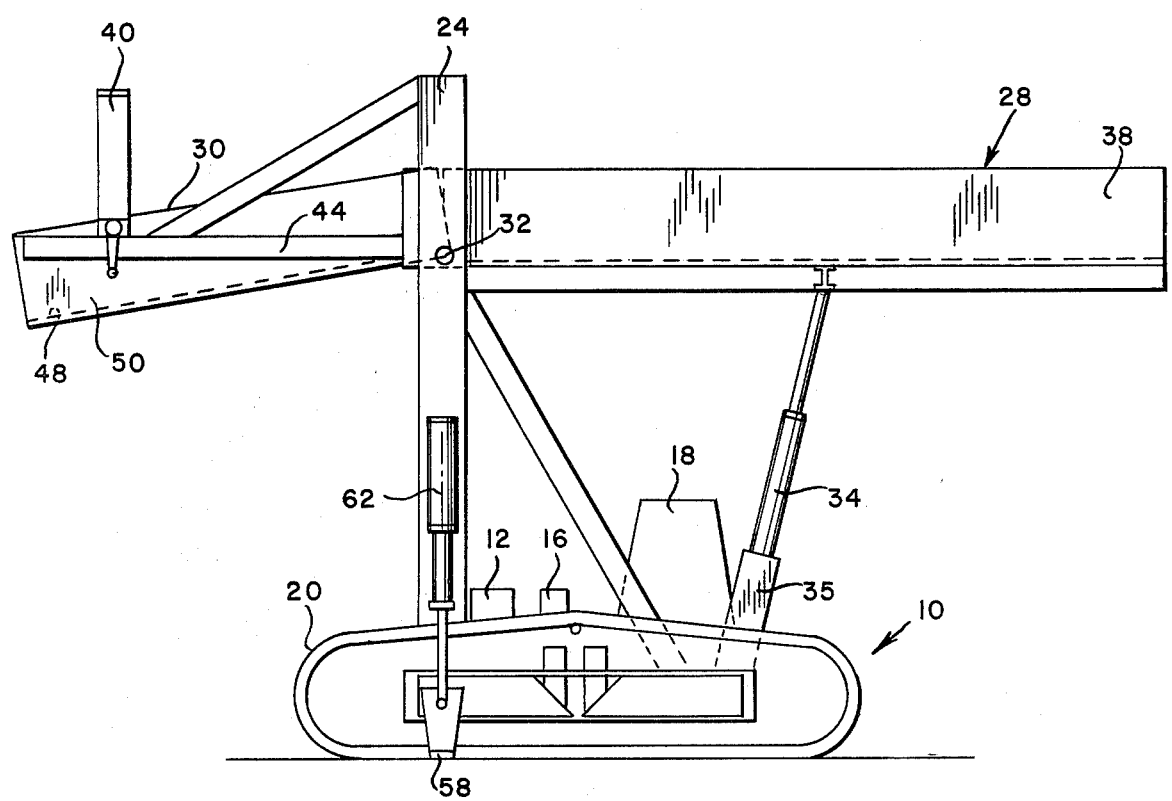
FIG. 5 is a detailed side view of the mobile unit shown in FIG. 1.

The mobile heavy duty truck loading system of this invention is supported on a self-propelled crawler structure 10 that provides an undercarriage for carrying the platform which provides a large-sized base member for the system in the order of about 20' by 20', for example, although dimensions are not critical. As best seen in FIGS. 3 and 5, the platform 11 is designed to carry a suitable power plant and hydraulic pump means 12, controls 16 and an enclosed operator's station 18. The platform may be provided with any type of mobile support means but preferably, as shown, has a pair of crawler track members 20 and 22 that are driven from motor 12 by suitable power transmission means. The tracks may be controlled independently one from another under the control of the operator to make it possible to maneuver this mobile loader from place to place along the bank at the edge of the bench to be worked.

Figure 1:
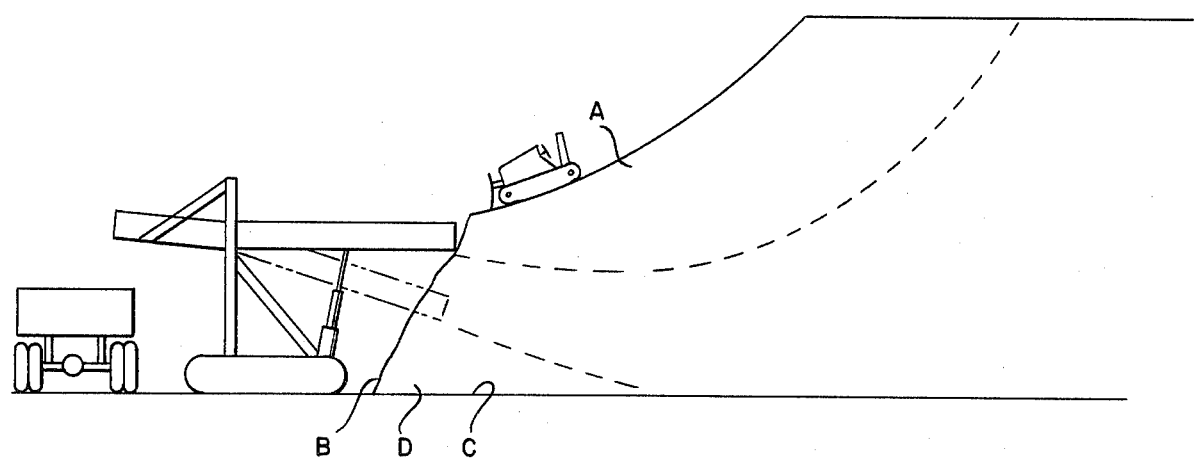
FIG. 1 is a side elevation showing the rudimentary form of a mobile unit in position at a bench to be cleared for strip mining operations.

At one end of the platform, the structure has two rigid post elements or masts 24 and 26 that support a ramp means 28 and dump means 30 arranged in series, that together form a bridge over the mobile undercarriage. These means receive the dynamited overburden that is bulldozed onto the loading system, as will appear more fully below. At its outlet end, in this rudimentary form of the invention, the ramp is supported on bearing means 32 integral with mast 24 and mast 26 and toward its inlet end, the ramp is carried on a plurality of extensible hydraulic motors 34, pivotally mounted at their lower ends on the stands 35 integral with the base of the crawler structure 10 and pivotally carried at their upper ends on the underside of the ramp 28 so that the inlet end of the ramp may be raised and lowered as indicated in FIG. 1. As shown in the plan view of FIG. 4, the ramp has a floor 36 and side walls 38 that are flared or are funneled inwardly to form a passageway leading from a wide entrance to a somewhat narrowed exit end.

At its wider inlet end, the ramp is designed to be positioned at the bench to be cleared to cooperate with a plurality of bulldozers that may be working on the bench to push the dynamite-loosened overburden onto this loading system in order to uncover an ore or coal deposit. The entrance has a width several feet wider than the length of the blades of two bulldozers so that they may pass one another at the entrance onto the ramp. Thus, by way of example and not by limitation, the entrance to the ramp may be in the order of 36' wide and at its exit end it may be approximately 18' so that at the entrance one dozer may be moving across the entrance to push a load of overburden onto the ramp means while the preceding dozer is retreating back onto the bench to collect another load.

The dump means 30 shown in FIG. 5 may also be pivotally supported on the bearing means 32 at its inlet end and its outlet end is supported at the lower end of the extensible hydraulic lifts 40 that, in turn, are supported at the ends of the generally horizontally extending arms 44 and 46 fixed to the upper ends of masts 24 and 26.

When the unit is positioned for disposing of the overburden to be removed, the dump means may be initially held in a raised, substantially horizontal position to receive and store bulldozed overburden on a floor 48 and between walls 50 and 52. When in its raised position as shown in FIG. 5, the dump means is loaded with material pushed over or onto the ramp and then onto the dump means where it may be temporarily stored until the dump is lowered.

The dump means may be as wide as 16' and have a length of 16', for example, and have walls 3' high so that is can easily receive and store about 50 cubic yards of material that may be piled thereon by the bulldozers for temporary storage while an empty truck is being spotted at the loading station. As soon as a truck is spotted, the dump can be slowly lowered under the control of the hydraulic motors 40 and 42 to gently drop the stored load of overburden into the truck. With this arrangement, bulldozers may be driven from the bench to push the overburden over the ramp and onto the dump means continuously while a truck is being spotted and thereafter, when a truck is in position under the dump it may be lowered and the dump means 30 forms a chute for filling the bulldozed overburden into the spotted truck.

The masts of this rudimentary system are designed to support the bearing means 32 at a height of about 20' above the ground level on which the tracks rest so that the outlet end of the dump means 30 is supported at a height to permit a heavy dump truck to be moved into position under it to deliver the overburden into the truck. Once the truck is in position, the hydraulic motors 40 and 42 may be operated to let any material stored in dump means 30 flow into the truck body and after a truck has been filled, the dump may be raised to serve as a temporary storage means to receive the bulldozed overburden while the next empty truck is being moved into position.

Figure 2:
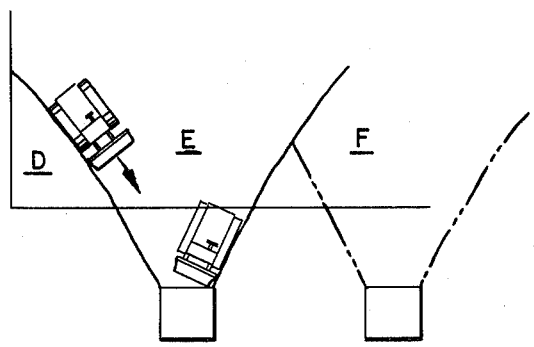
FIG. 2 is a top plan view of the bench of dynamite-blasted overburden showing the successive loading stations that are adapted to be bulldozed onto the loading system to be delivered into trucks for removal.

As seen in FIGS. 1 and 2, after the overburden A has been blasted, as is conventional to loosen it, the mobile platform may be moved into position and the ramp elevated into a position so that the inlet end of the ramp can be driven into the exposed wall B of the overburden. The several bulldozers working on the surface of the bench can be operated in an alternating sequence to push the overburden onto the ramp or across the ramp and onto the dump means. Two or more bulldozers may be used to doze the overburden onto or over the ramp and because of the width at the inlet end of the ramp, one bulldozer can be backing off the ramp while the other bulldozer moving onto the ramp with another load. The bulldozers can be used to push the overburden over the ramp and onto the dump means 30 and as above described, the loading of the dump means can progress while an empty truck is being spotted. As soon as a truck is in place, filling of the truck can proceed by operation of motors 40 and 42 to lower the dump means so the stored load is gently dropped into the empty truck, all the while bulldozers can be pushing additional loads of overburden onto the ramp to be pushed onward to the dump means so that after dumping a stored load from the dump into a truck, the dump or loading means 30 serves as a chute for directing the remaining overburden bulldozed over the ramp into the truck. It is therefore, not necessary to hold up the bulldozing operation during the truck spotting process so that the truck loading activity can proceed most expeditiously.

When all the overburden at the initial position E of the bench, shown in FIG. 2, has been bulldozed over the ramp, the mobile loading system may be moved a short distance away from the wall on its crawler support means and the ramp may be lowered by the operation of motors 34 to move the ramp to the dotted line position, for example, shown in FIG. 1. After the ramp has been lowered, the loading system may be driven back toward wall B to drive the entrance end of the ramp into the wall B of the bench and then the bulldozing and truck loading operations can proceed as before until substantially all of the area at E has been cleared. The removal of overburden can proceed in successive stages E, F, etc., shown in FIG. 2, until the overburden has been substantially all cleared away to expose the surface C of the layer of ore or the top of the coal seam to be worked in the strip mining operations. As indicated in FIG. 2 with this rudimentary system, a small portion D of the overburden at the edge of the wall remains after the bulldozing operations have been completed. However, referring to FIG. 2, it is seen that by properly working the bench, such material may be pushed over from section E to the next area F of the bench to be cleared as each successive section is removed so that ultimately all but one of these small ramp-like sections of overburden left at the inlet end of the ramp can be bulldozed onto the ramp to be moved by the bulldozers onto the dump means for delivery into a truck for removal. The last portion D remaining at the end of the bulldozing operations may be removed with a front end loader or other means.

Figure 6:
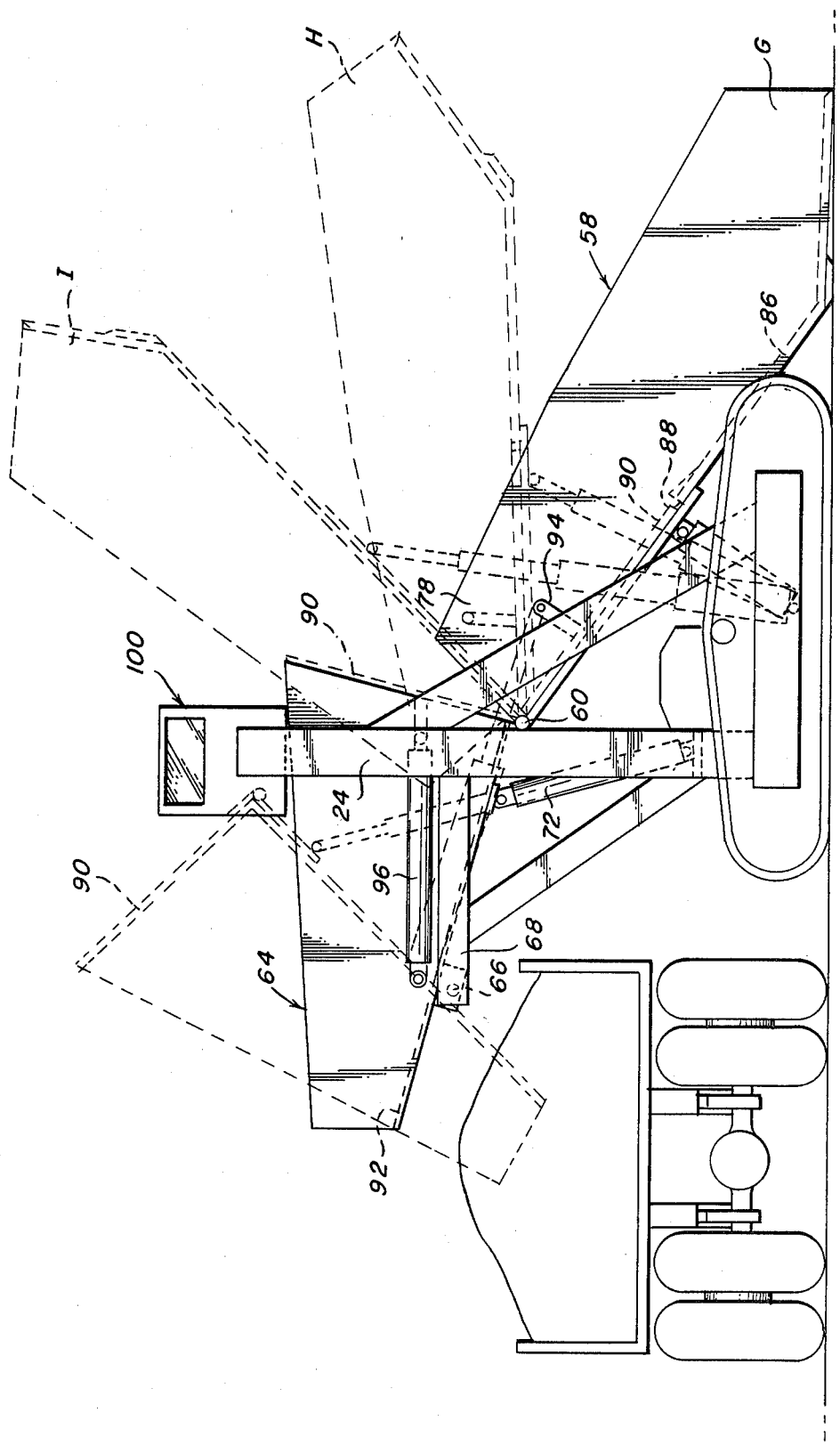
FIG. 6 is a side elevation of the preferred form of the invention.

The description above relates to the very rudimentary form of the present loading system. The preferred form of the invention is shown in FIGS. 6 and 7 wherein it is seen that the overall center of gravity of the structure has been substantially lowered and the operator's cab has been elevated to a position above the entire field of operations so that he can have better command of all aspects of the bulldozing and truck loading operations.

In this form of the loading system the crawlers 20 and 22 support platform 11 as described above, on which the power plant and hydraulic pump means 12 are carried. The platform also supports masts 24 and 26 which carry the ramp means 58 that is mounted on individual horizontally aligned bearing means 60 carried on the individual masts 24 and 26. This ramp swings about the bearings 60 as it is raised or lowered by the hydraulic lifting means 62 to move the ramp from the full line position G shown in FIG. 6 to the dotted line positions H and I. The ramp has an inlet end that is configured to lie flat against the surface over which the crawlers operate to cooperate with bulldozers that may be working at this ground level and also the ramp may be raised to an intermediate position H to engage against the exposed wall B of a bench being worked to receive bulldozed overburden being pushed from the bench onto the ramp. It will be noted that the inlet end of the ramp, when raised to an intermediate position such as H, does not have a substantially planar relation with respect to the top surface of the bench, however, the pocket which results from thus positioning the ramp in a partially raised position against the bench, is easily filled with bulldozed material so that the several bulldozers working over the bench can ultimately move onto the ramp and bulldoze a full load onto the ramp as the loading operations progress.

At its outlet end, ramp 58 is adapted to cooperate with the dump means 64 that is mounted to occilate about a horizontal bearing shaft 66 that is supported between the outer ends of the horizontal beams 68 and 70, integral with masts 24 and 26 respectively. The dump means is movable from the full line position shown in FIG. 6 where its inlet communicates with the outlet from ramp 58, to the dotted line position for sliding a load of overburden into a truck. The dump means is moved from one position to the other by means of the hydraulic motors 72, 74 and 76, supported on platform 11 at one end and connected to the underside of the dump means at their other ends.

The side walls 78 and 80 at the outlet end of the ramp 58 are designed to slide conveniently over the outside of the side walls 82 and 84 of the dump means. The floor 86 of the ramp is provided with a recess 88 adjacent its outlet end to receive a swinging gate means 90 that is adapted to be raised after the dump means has been loaded to cover the inlet end of the dump means, but which is laid flat in recess 88 in the ramp means while the overburden material is being bulldozed over the ramp and into the dump means. The cover 90 is carried in suitable bearing means integral with the underside of floor 92 of the dump means at its inlet end. The door has integral posts 94, one on each side, adapted to pass closely adjacent the outside of walls 82 and 84 of the dump means as the door 90 swings from its position in recess 88, as shown in FIG. 6, to the position shown in dotted lines for closing the inlet end of the dump means. Suitable hydraulic motors 96 and 98 are supported at one end on each of walls 82 and 84 respectively, and at the other ends to posts 94. The motors may be energized by the operator to move the door 90 from the full line position of FIG. 6 to the dotted line position to close the inlet to the dump means.

The crawlers 20 and 22, the ramp means 58 and the dump means 64 are all moved as required from time to time under the control of a single operator seated in a cab 100 supported at the upper end of mast 24. In this position, the operator has an overall view of the entire system including having an opportunity to observe the movement of the bulldozers as they work the bench, the filling of the loading system with bulldozed overburden and the movement of trucks to and from the filling station under the dump means. From this elevated vantage point, it is possible to more easily coordinate the movement of the bulldozers with the loading of the trucks to make the most efficient use of all the machinery.

When this preferred form of the invention is in use, the operator manipulates the system to drive the inlet end of the ramp against wall B of the bench from which the overburden is to be removed. The bulldozers are then put in service to fill the ramp. Wheen the dump 64 is to be filled, the ramp 58 is raised by its motors 62 to the dotted line position I shown in FIG. 6. Then the door 90 is raised from recess 88 to close the inlet to the dump to hold its load in place until the dump means can be operated to empty its load into the truck body as shown. It will be noted that as soon as the dump means is raised from its full line position of FIG. 6, and while the ramp is raised to its dotted line position, any debris in recess 88 will fall to the ground and after the dump has been emptied and the ramp and dump returned to their positions to be filled, the door 90 returns easily to recess 88.

After the dump has emptied its load into the truck, the operator may gently spread the load in the truck by movement of the dump means, the end of which may be buried in the overburden filled into the truck. The dump means is then moved to the full line position shown in FIG. 6 to be filled. Meanwhile, the ramp is being loaded without having to wait for the dumping step.

When the bench has been substantially cleared, debris that has fallen to the ground in front of the bench can be cleared by moving the loading system a short distance away from the bench on its crawlers and after lowering the ramp to ground level, driving the system back to the bench to use the inlet to the ramp substantially like a front end loader to scoop all the debris from the ground into the ramp. When the ramp is again positioned against the wall of the bench at ground level, a very satisfactory final clean-up operation can be completed with the bulldozers without requiring the use of front end loaders or other equipment as has been required in the past.

This preferred form of the loading system provides a compact structure having a relatively low center of gravity. The pivoting of the dump means at the outer ends of arms 68 and 70 holds the dump in a position over the top of the truck body while the dump is being filled and a truck spotted at its loading station and yet permits the load to be gently dumped into the truck when the outlet of the dump is lowered into the truck body. When the dump is supported on a bearing shaft positioned just past its midpoint, the dump is stable under load and yet may be relatively easily raised when loading has been completed and a truck is to be filled. The dump can be designed to hold a full truck load of bulldozed overburden so that with a single loading operation and one dumping step, a truck can be filled. When several bulldozers are in operation, such activity is well within the capability of the loading system of this invention.

The use of either the preferred form or other dump means and ramp as here shown, in effect, provides a heavy duty mobile loading apparatus for supporting a pair of bulldozers as well as the material collected in front of the bulldozer blades for delivery into a truck spotted at the outlet from the dump means. The construction may be made rugged as well as simple, and can be controlled by a single operator who can dictate the motion and positions of all the elements of the unit as required from a single operator station. The mobile unit may be easily moved from position to position and once the bench stripping operation has been started, the bulldozers may be operated substantially continuously while a line of trucks are moving to and from the loading zone to be spotted, filled and moved away, it being possible to continue the bulldozing activity without the necessity of there being a truck under the dump means.

While the preferred form of the invention and certain modifications thereof have been described herein, it is possible that other modifications may occur to those skilled in the art that will fall without the scope of the following claims.

I claim:

1. A heavy duty truck loading means carried on a mobile transporter for receiving material pushed by the blade of a bulldozer means onto the loading means for loading into a truck, comprising: a self-propelled carrier, a ramp means adapted to receive material bulldozed onto said ramp means, a support on said carrier upon which said ramp means is movably mounted, a dump means carried by a support on said carrier to hold said dump means above the truck to be loaded, said ramp and dump means being independent elements having powered means operative to raise and lower said ramp and dump means independently one with respect to the other for positioning the ramp means to receive material that is bulldozed thereonto and position said dump means to receive material from said ramp and empty the material into said truck positioned under said dump means.

2. A heavy duty means as in claim 1 wherein said support includes a mast element integral with said carrier.

3. A heavy duty means as in claim 2 wherein said ramp and dump means are supported on pivot bearings carried on said mast element.

4. A heavy duty means as in claim 2 wherein said mast element extends upwardly from one end of the platform carrier, a horizontal arm fixed to the upper end of said mast, said arm extending from the mast beyond said end of the carrier, and bearing means mounted adjacent the end of said arm for supporting the dump means.

5. A heavy duty means as in claim 1 wherein said mobile transporter is a crawler carried platform.

6. A heavy duty means as in claim 5 wherein said ramp and dump means are independent elements and said ramp has an inlet end and outlet end, said outlet end of said ramp communicating with said dump means, and said inlet end having a width that is wider than the length of two bulldozer blades if positioned end to end across the inlet.

7. A heavy duty means as in claim 6 wherein the outlet end of said ramp is about equal in width to the length of a single bulldozer blade.

8. A heavy duty means as in claim 7 wherein said ramp has integral side walls to direct material bulldozed over its inlet end to flow over the outlet end thereof onto said dump means.

9. A heavy duty means as in claim 8 wherein said dump means has side walls to contain material flowing from the outlet of said ramp onto it from said ramp for temporary storage on said dump means.

10. A heavy duty means as in claim 9 having a pair of mast elements on said carrier, pivot bearings on said mast elements for supporting the outlet end of said ramp means in position to communicate with said dump means, pivot bearing means on said mast elements to support the inlet end of said dump means, independent hydraulically driven means to swing said ramp and dump means on said bearings, the hydraulic means for driving the ramp being below the ramp and the hydraulic means for the dump being above the dump.

11. A heavy duty means as in claim 1 wherein said powered means includes individual hydraulic means to raise and lower each of said ramp and dump means.

12. A heavy duty means as in claim 1 wherein said dump means is of a size to store a truck filling load of material bulldozed thereon while a truck is being moved into position to receive the material and said dump means directs said material into the truck when the dump means is operated.

13. A heavy duty means as described in claim 1 wherein said ramp means has an inlet end adapted to rest on the ground and said ramp means being movable about said support to raise said inlet of said ramp from said ground level position to empty the material bulldozed onto the ramp into said dump means.

14. A heavy duty means as in claim 13 wherein said dump means has an inlet and outlet end and a door is provided that may be moved from an opened to a closed position at the inlet to said dump means, said door being opened while the dump means is receiving material from said ramp and being closed while said dump is emptying material into said truck.

15. A heavy duty means as in claim 14 wherein said ramp means has a floor and side walls for receiving the material and said door is integrated with the floor of said ramp means when the door is fully opened.

16. A heavy duty means as in claim 1 wherein said support for said ramp means and said dump means is a mast structure integral with and extending upwardly from said platform carrier, an operator's cage on said transporter, and said cage being carried by said mast structure in a position above said ramp means and said dump means.

* * * * *